(12) United States Patent
Padden et al.

(10) Patent No.: US 10,778,266 B2
(45) Date of Patent: Sep. 15, 2020

(54) SMART TAPS

(71) Applicant: Cable Television Laboratories, Inc., Louisville, CO (US)

(72) Inventors: Joseph Padden, Boulder, CO (US); Thomas Holtzman Williams, Longmont, CO (US); Jonathan Ray Dennis, Louisville, CO (US); Daryl William Malas, Broomfield, CO (US); Dan Schrimpsher, Louisville, CO (US); Douglas D. Jones, Louisville, CO (US)

(73) Assignee: Cable Television Laboratories, Inc., Louisville, CO (US)

( * ) Notice: Subject to any disclaimer, the term of this patent is extended or adjusted under 35 U.S.C. 154(b) by 0 days.

(21) Appl. No.: 16/154,935

(22) Filed: Oct. 9, 2018

(65) Prior Publication Data

US 2019/0109608 A1  Apr. 11, 2019

Related U.S. Application Data

(60) Provisional application No. 62/731,587, filed on Sep. 14, 2018, provisional application No. 62/678,123, filed on May 30, 2018, provisional application No. 62/618,429, filed on Jan. 17, 2018, provisional application No. 62/569,308, filed on Oct. 6, 2017.

(51) Int. Cl.
| | |
|---|---|
| *H04B 1/10* | (2006.01) |
| *H04B 3/32* | (2006.01) |
| *H04B 10/2507* | (2013.01) |
| *H04L 12/26* | (2006.01) |

(52) U.S. Cl.
CPC ........ *H04B 1/1027* (2013.01); *H04B 1/1081* (2013.01); *H04B 3/32* (2013.01); *H04B 10/2507* (2013.01); *H04L 43/16* (2013.01)

(58) Field of Classification Search
CPC ...... H04B 1/1027; H04B 1/1081; H04B 3/32; H04B 10/2507; H04L 43/16
See application file for complete search history.

(56) References Cited

U.S. PATENT DOCUMENTS

| | | | |
|---|---|---|---|
| 5,745,386 A | 4/1998 | Williams | |
| 5,815,794 A | 9/1998 | Williams | |
| 5,867,764 A | 2/1999 | Williams | |
| 5,870,513 A | 2/1999 | Williams | |
| 6,160,990 A * | 12/2000 | Kobayashi | H04N 7/102 348/E7.052 |
| 6,580,336 B1 * | 6/2003 | Gerszberg | H01R 13/7031 333/100 |
| 6,880,170 B1 * | 4/2005 | Kauffman | H04N 7/102 348/E7.052 |
| 2003/0114112 A1 * | 6/2003 | Strater | H04N 7/102 455/67.11 |
| 2007/0169162 A1 * | 7/2007 | Kola | H04N 21/2402 725/117 |

(Continued)

*Primary Examiner* — Randy A Flynn

(74) *Attorney, Agent, or Firm* — Great Lakes Intellectual Property, PLLC

(57) ABSTRACT

Mitigating noise in a network is contemplated, such as but not necessarily limited to mitigating noise through a detection process whereby noise deviations resulting from selectively controlling smart taps, switches or other devices to block signaling in the network may be used to locate sources of noise.

20 Claims, 6 Drawing Sheets

(56) References Cited

U.S. PATENT DOCUMENTS

| | | | |
|---|---|---|---|
| 2009/0133095 A1* | 5/2009 | Phillips | H04N 7/104 725/149 |
| 2011/0099601 A1* | 4/2011 | Riggsby | H04N 21/6118 725/127 |
| 2012/0044361 A1* | 2/2012 | Riggsby | H04N 7/104 348/192 |
| 2013/0244481 A1* | 9/2013 | Holland | H01R 24/46 439/578 |
| 2014/0314407 A1* | 10/2014 | Bush | H04B 10/25751 398/45 |
| 2018/0098130 A1* | 4/2018 | Kim | H04N 21/43635 |

* cited by examiner

SMART TAPS

CROSS-REFERENCE TO RELATED APPLICATIONS

This application claims the benefit of U.S. provisional application No. 62/569,308 filed Oct. 6, 2017, U.S. provisional application No. 62/618,429 filed Jan. 17, 2018, U.S. provisional application No. 62/678,123 filed May 30, 2018 and U.S. provisional application No. 62/731,587 filed Sep. 14, 2018, the disclosures of which are hereby incorporated in their entireties by reference herein.

TECHNICAL FIELD

The present invention relates to mitigating noise in a network, such as but not necessarily limited to mitigating noise through a detection process whereby noise deviations resulting from selectively controlling smart taps, switches or other devices to block signaling in the network may be used to locate sources of noise.

BACKGROUND

Mitigation of noise in a network, such as noise resulting from upstream ingress signals, can be resource intensive and inefficient, particularly when the network employs a bounded medium, such as one utilizing optical fiber and/or coaxial cable or other constructs to non-wirelessly bind signaling over a constrained infrastructure. The bounded medium may require technicians to perform some variant of a manual search or leverage personal history with a segment of the network to identify a source of an ingress issue in what may be essentially a trial and error process of physically inspecting different portions of the bounded medium. The imprecise nature of relying on technicians to troubleshoot noise in such a manner can result in a significant percentage of truck roll hours being spent in a search process where the technicians hunt for noises according hunches, experience and guesswork, often with the technicians having to physically and laboriously disconnect or isolate portions of the network to check on its association with the noise. The technician time lost hunting for the noise can be expensive and the downtime associated with disconnecting portions of the network can impair or disrupt services for customers.

The challenges of detecting noise can vary depending on the number of legs, connections or other signaling paths within the infrastructure of a network. In hybrid fiber-coaxial (HFC) plants and other such networks, optical to electrical nodes may have two, four or more input/output coax taps, ports, legs, etc. within different portions/segments of the network arranged in a tree-branch structure forming any number of signaling paths. The signaling paths may be associated with one or more branches served by a set of cable modem termination system (CMTS) upstream ports or other connections associated with a termination point/device in the network whereat signals for multiple paths may converge. Signals and noise from each tap, port or other access point to the network can sum together when traveling to the point of convergence in a process referred to as noise funneling. Noise funneling can present particular challenges in isolating the portion(s) of the noise coming from certain taps, branches, legs or other sources or signaling paths within the network due to difficulties in apportioning the noise to particular sources after the signals carrying the noise have been summed as part of the infrastructural funneling.

One non-limiting aspect of the present invention contemplates ameliorating the guesswork and customer disruption in identifying sources of noise in a network, including doing so when the sources of noise may be obfuscated due to a network infrastructure causing noise funneling at a CMTS, termination point/device or other confluence or convergence.

DETAILED DESCRIPTION

As required, detailed embodiments of the present invention are disclosed herein; however, it is to be understood that the disclosed embodiments are merely exemplary of the invention that may be embodied in various and alternative forms. The figures are not necessarily to scale; some features may be exaggerated or minimized to show details of particular components. Therefore, specific structural and functional details disclosed herein are not to be interpreted as limiting, but merely as a representative basis for teaching one skilled in the art to variously employ the present invention.

Figure 1:
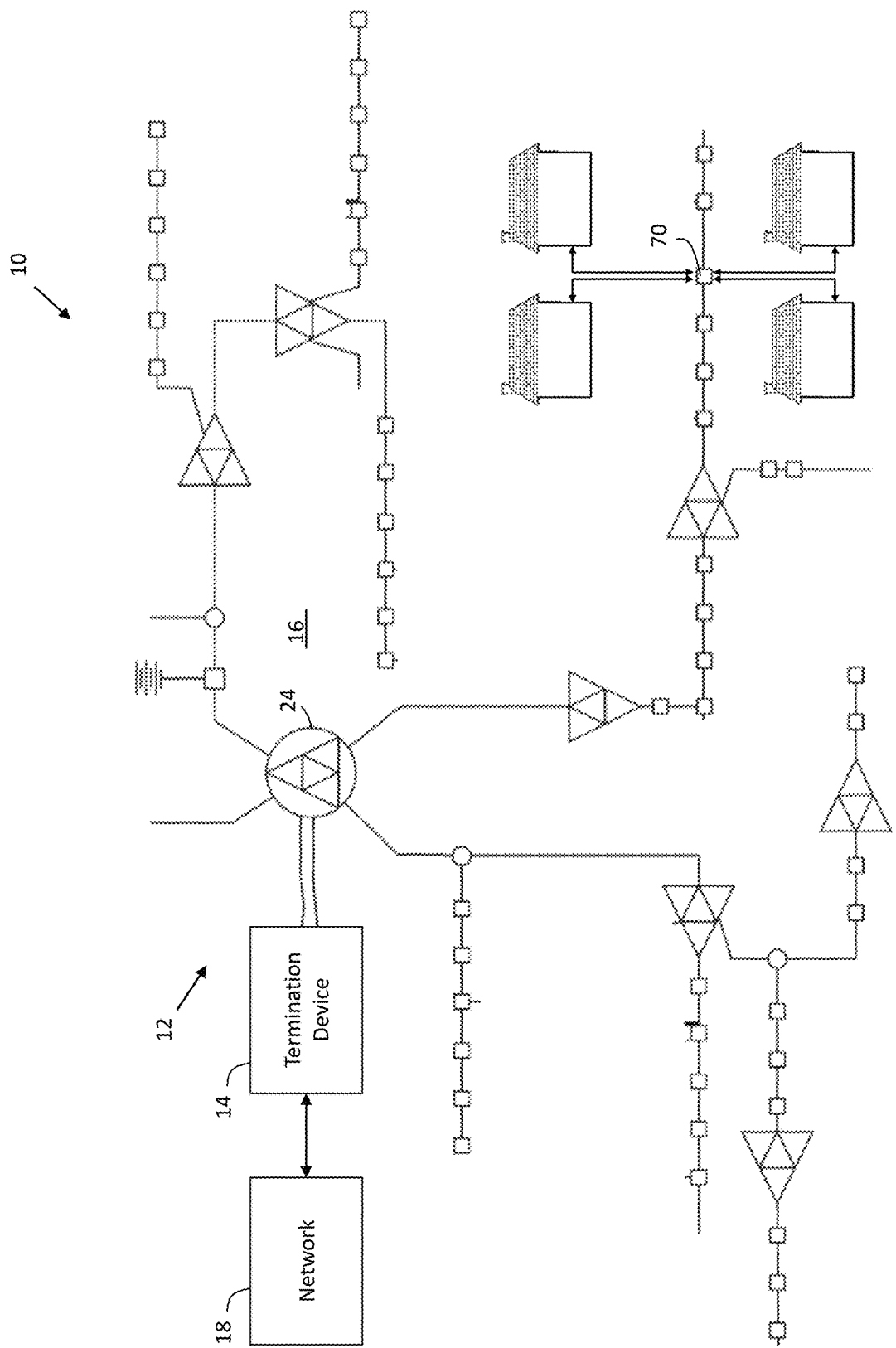
FIG. 1 illustrates a system for mitigating noise in a network in accordance with one non-limiting aspect of the present invention.

FIG. 1 illustrates a system 10 for mitigating noise in a network 12 in accordance with one non-limiting aspect of the present invention. The network 12 may be any type of network having capabilities sufficient to facilitate exchanging signaling between a termination device 14 and any number of clients over a bounded medium 16. The network 12 may be configured to facilitate transport of virtually any type of signaling, including signaling associated with a multiple system operator (MSO), such as but not necessarily limited to a cable, satellite, or broadcast television service provider, a cellular service provider, and high-speed data service provider, an Internet service provider (ISP), etc. and according to virtually any networking protocol. The network 12 may utilize any combination of wired and/or wireless signaling to facilitate the signal exchange and is illustrated as at least partially including the bounded medium 16 to facilitate signal exchange between the termination device 14 and a plurality of taps (shown as boxes). The taps may be access points or other connections whereby the clients, e.g., devices, endpoints, access points, gateways, settop boxes (STBs), televisions, phones, enodeBs, terminals, etc., connect to the bounded medium to facilitate exchanging signals with the termination device. The termination device 14 may be any device tasked with terminating signaling carried over the bounded medium 16 and/or facilitating further signal exchanged in the illustrated manner with an additional network 18.

The network 12 is predominantly described for exemplary, non-limiting purposed as being associated with a cable network, such as one operating in accordance with Data-Over-Cable Service Interface Specifications, DOCSIS 3.1, Physical Layer Specification, CM-SP-PHYv3.1-114-180509, the disclosure of which is hereby incorporated in its entirety by reference herein, whereby the termination device 14 may be a cable modem termination system (CMTS) and/or headend tasked with facilitating signaling with cable modems (CMs) or other devices connected through one or more of the taps. The signaling may travel through the bounded medium 16 in the manner described in U.S. patent application Ser. No. 14/181,645, entitled Multiple-Input-Multiple-Output (MIMO) Communication System, the disclosure of which is hereby incorporated by reference in its entirety, whereby one or more optical fibers cooperate with a fiber node 24 and a cable television distribution system having a plurality of coaxial cables to facilitate exchanging signals with a plurality of taps, optionally with use of splitters and/or amplifiers (shown as triangles). The termination device 14 is illustrated as being positioned at a confluence of four signaling branches/paths susceptible to noise funneling whereby ingress noise or other noise from the taps or clients associated therewith may sum to obfuscate the noise source within the attendant signaling.

The termination device 14 may mitigate noise in the network 12 by deducing sources of noise according to noise deviations resulting from selectively controlling the taps, switches or other devices to block signaling. One non-limiting aspect of the present invention contemplates utilizing the termination device 14 to facilitate ameliorating the guesswork and customer disruption in identifying sources of noise in the network 12 through an iterative process whereby upstream and/or downstream signaling between the termination device 14 and the taps may be selectively blocked to prevent the attendant signaling from passing therethrough while an assessment on corresponding noise deviation is made, i.e., the influence of the blocked signaling on altering the measured noise. The assessment of noise in the network 12 is predominately described with respect to being measured at the termination device 14 for exemplary, non-limiting purposes as similar processes may be performed at other locations within the network 12 without deviating from the scope and contemplation of the present invention. The assessment at the termination device 14 may be beneficial due to its positioning at a confluence of multiple signaling paths/branches and due to its capabilities to facilitate processes and operations that may be more difficult to implement at devices located downstream thereof. A computer or other processing mechanism at the termination device 14 may include a non-transitory computer readable medium having a plurality of instructions executable with a processor to facilitate selectively blocking signaling at different portions of the network 12 for purposes of isolating sources of noise depending on corresponding measurements at the termination device.

Figure 2:
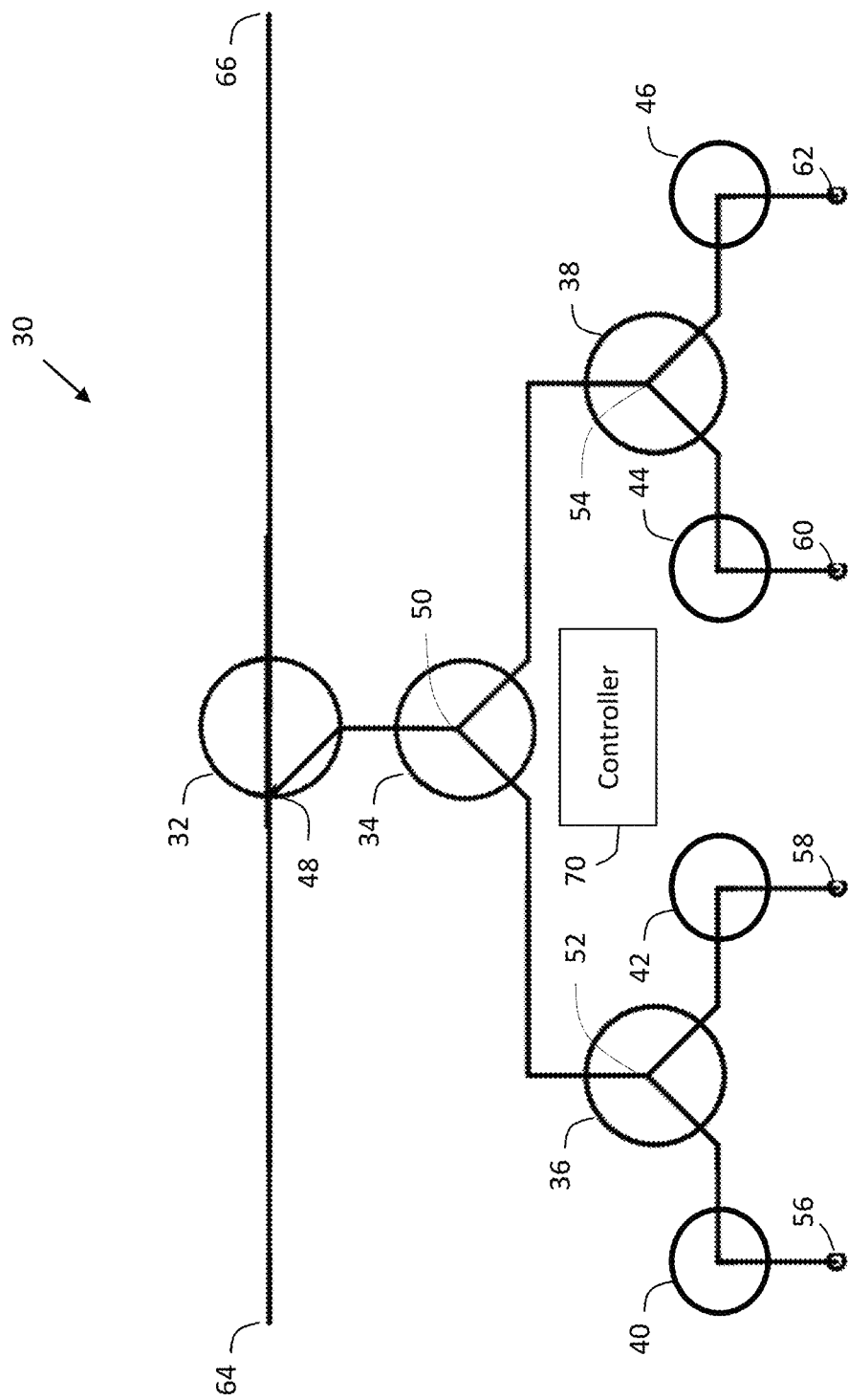
FIG. 2 schematically illustrates a tap in accordance with one non-limiting aspect of the present invention.

FIG. 2 schematically illustrates a tap 30 in accordance with one non-limiting aspect of the present invention. The tap 30 may correspond with one of the taps illustrated in FIG. 1 and include one or more switches 32, 34, 36, 38, 40, 42, 44 (shown with circles) to facilitate blocking signaling and correspondingly mitigating noise. The tap 30 is shown as including four splitters 48, 50, 52, 54 to facilitate multiple signaling paths sufficient to establish connectivity between a connected-to branch/neighboring taps and four client ports 56, 58, 60, 62. The illustrated tap 30 is exemplary of one type of tap that provides one or more client ports 56, 58, 60, 62 for connecting to client devices and an input port 64 and an output port 66 to facilitate communications between neighboring taps on the connected-to branch. A first splitter 48 may facilitate exchanging signaling via the input port 64 with another, upstream tap and with another, downstream tap via the output port 66. Three additional splitters 50, 52, 54 may be included to facilitate exchanging signaling between the input port 64 and the four client ports 56, 58, 60, 62. While the present invention contemplates the tap 30 including more or less client ports 56, 58, 60, 62 and/or additional ports to facilitating connecting to more neighboring taps and/or branches, the illustrated tap 30 is exemplary of one non-limiting aspect of the present invention whereby splitters 48, 50, 52, 54 or other features may be included in the taps to facilitating connecting clients the network via one of the branches.

The tap 30 may include any combination of switches and is shown for exemplary purposes as including eight switches 32, 34, 36, 38, 40, 42, 44 having capabilities sufficient to selectively block signaling through any path of the tap 30. The switches 32, 34, 36, 38, 40, 42, 44 may be configured to facilitate blocking upstream and/or downstream signaling, such as when temporally controlled from a normally closed position to an opened position, according to instructions provided from a controller 70. The controller 70 may generate corresponding instructions according to wired and/or wireless messages, signals, etc. transmitted thereto from the termination device 14 or other device attempting to mitigate noise in the network 12. The closed position may permit signaling to pass therethrough without disruption and the opened position may be prevent upstream and/or downstream signaling from passing therethrough until returned to the closed position. The contemplated noise mitigation may deduce sources of noise by measuring noise deviations resulting from different combinations of such switches 32, 34, 36, 38, 40, 42, 44 throughout the network being controlled to block signaling therethrough. The illustrated switches 32, 34, 36, 38, 40, 42, 44 may provide an iterative capability to isolate a source of noise by coordinating control to the opened position. The switch control may optionally specify a bounce or a length of time the switches 32, 34, 36, 38, 40, 42, 44 are in the opened position, such as a length of time or duration insufficient to disrupt services or disconnect clients from existing services. While relays or other switches having moving components may be used, one non-limiting aspect of the present invention contemplates the switches 32, 34, 36, 38, 40, 42, 44 being solid-state devices capable of being opened and closed in milliseconds, e.g., 200 ms, and at a rate faster than non-solid-state devices so as to enable the opening and closing thereof without disrupting or disconnecting client services.

One process for deducing a source of noise may include coordinating opening and closing of the switches 32, 34, 36, 38, 40, 42, 44 according to resulting noise deviations, such as by initially opening the first switch 32 to block signaling from the downstream taps to see if sufficient to generate a noise deviation indicative of the noise being correspondingly isolated or reduced below a desired threshold, and if insufficient, selectively opening one or more of the additional switches 34, 36, 38, 40, 42, 44 until the noise is isolated, and if that is still insufficient, i.e., deducing the noise failing to result from the client ports 56, 58, 60, 62 or the downstream tap, repeating the process at another tap connected upstream thereof. In the event opening of the second switch 34 is sufficient to reduce noise to acceptable levels or otherwise indicate sufficient isolation of noise, a technician can then deduce the source of noise to be associated with one of the four client taps 56, 58, 60, 62 and make corresponding repairs with insight. Additional switch control may be undertaken to further define the likely source by assessing corresponding deviations when selectively opening one of the third and/or fourth switches 36, 38 to isolate the likely noise source to the first and second ports 56, 58 or the third and fourth ports 60, 62, or additionally by selectively opening the fifth, sixth, seventh and/or eighth switches 38, 40, 42, 44 to isolate the likely noise source to one of the first, second, third and fourth taps 56, 58, 60, 62.

There may be many possibilities for deducing likely sources of noise through noise deviations associated with correspondingly controlling switches to block signaling passing therethrough. The foregoing examples initiate such a sequence by initially blocking signaling through the first switch 32 in a test that effectively determines the likely source of noise to be at some location in the branch downstream thereof when the resulting deviation produces a sufficient change in measured noise, e.g., with the next, downstream tap or other scenario, i.e., branch/line problem, etc. Such an approach may be useful in chunking or isolating large portions or branches of the network at once to ascertain broad areas as potential sources of noise. Narrowing down the likely source of noise to a location thereafter may require additional analysis of additional taps downstream thereof as it may still be relatively inefficient for a technician to check what may be a lengthy string of taps. It may be beneficial to repeat the process at each of the downstream tap having its first switch 32 opened, i.e., to selectively block the second, third, etc., switches 34, 36, 38, 40, 42, 44 to further isolate the likely source of noise.

The capability to selectively block signaling through switches 34, 36, 38, 40, 42, 44 included at the taps 30 may be beneficial in facilitating any number of noise assessments. The foregoing generally corresponds with attempting to isolate noise sources to particular taps and/or client ports, but the present invention may be equally useful in identifying other noise sources, i.e., those that may arise in between taps, such as through splicing, branch breakage or other events. One process that may be useful in assessing branch integrity independently of the client ports and/or taps may correspond with closing all of the second switches 34 included on each tap associated with a particular branch or segment of the network such that the corresponding control would indicate the likely source of noise to be at a location independent of the taps. If the noise persists after all the second switches 34 of all the taps in a portion of the network are blocking signaling, i.e., after all signaling between the branch and the client ports 56, 58, 60, 62 are blocked with opening of the second switch 34 while the first switch remains closed 32 to permit signaling between taps, then it may be inferred that the likely source of noise is somewhere other than one of the taps/client ports. The third, fourth, fifth, sixth, seventh and/or eight switches 36, 38, 40, 42, 44 may be similarly controlled to block signaling to provide additional granularity as to the likely source of noise, i.e., each of the third and fourth switches can be opened while the first and second switches are closed.

Figure 3:
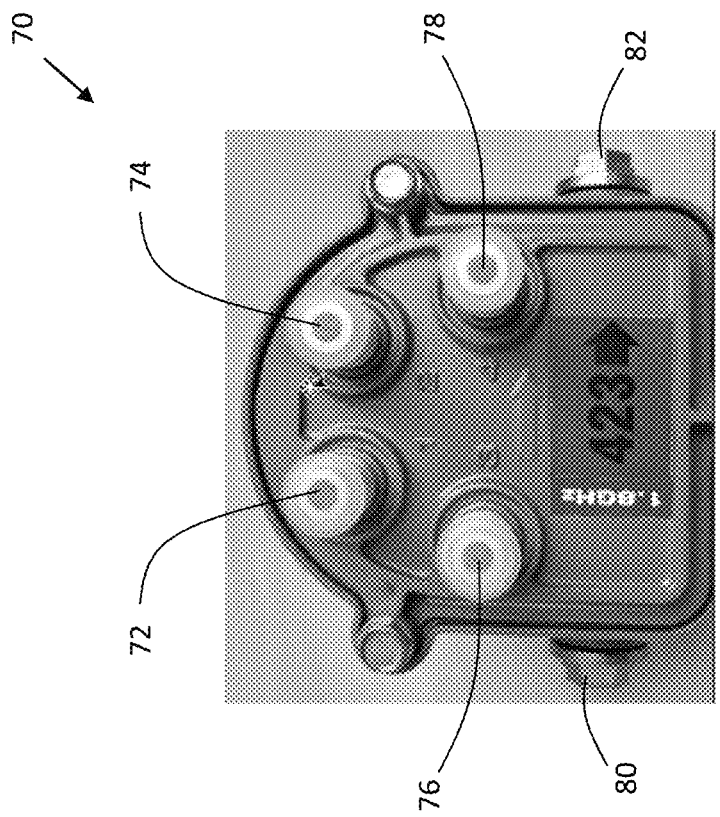
FIG. 3 illustrates a tap in accordance with one non-limiting aspect of the present invention.

FIG. 3 illustrates a tap 70 in accordance with one non-limiting aspect of the present invention. The tap 70 may include a housing for enclosing the switches, splitters and other componentry schematically illustrated in FIG. 2 and/or other circuitry and/or features attendant to facilitate the operations described herein. The tap 70 may include four cable connectors 72, 74, 76, 78 to facilitate interfacing the client ports with cables used by clients to connect thereto and additional connectors 80, 82 to facilitate connecting the input and output ports to the associated branch of the network. The cable-connectors 72, 74, 76, 78 may include threads or fasteners to secure the clients thereto in the event cable-type connectors are utilized as is common in HFC-type networks. The tap 70 may optionally be manufactured as commodity type of device, such as one associated with the Internet of Things (IoT), and/or as replacement part capable of being added to new and/or existing network branches using connectors and footprints commonly employed in many miles of HFC network already deployed and contemplated for deployment in the future. The tap 70 may be differentiated from existing or known taps lacking the capability to selectively control embedded switches such that the tap may be referred to as a "Smart Tap". The tap 70 is merely illustrative of one type of tap that may be employed with HFC networks as the present invention fully contemplated the tap being adapted for use with fiber or other non-cable mediums to facilitate implementation of the contemplated noise mitigation.

Figure 4:
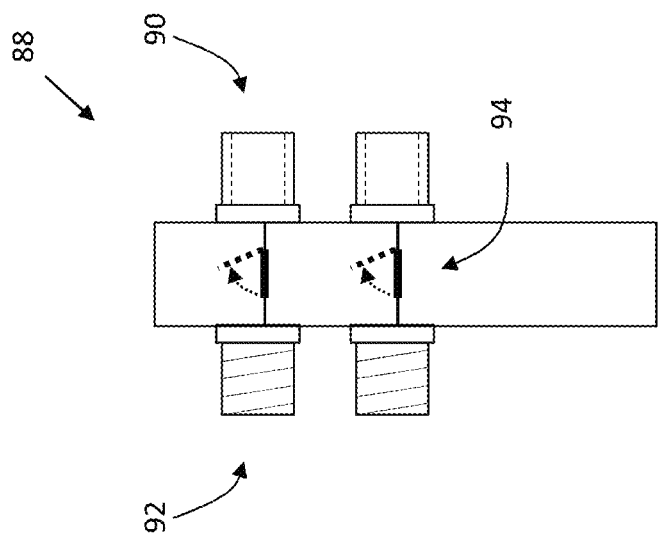
FIG. 4 illustrates a switch in accordance with one non-limiting aspect of the present invention.
Figure 5:
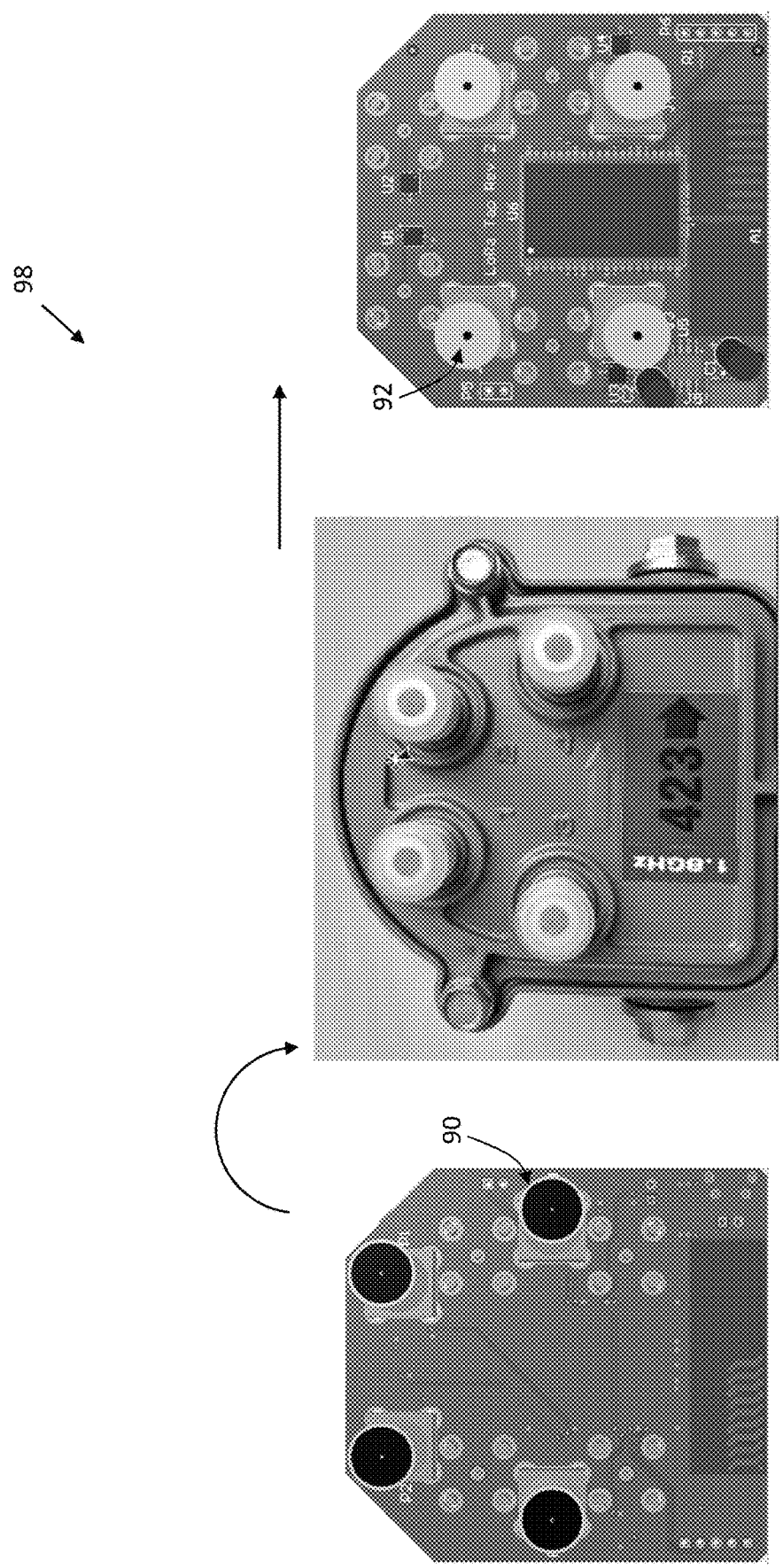
FIG. 5 illustrates an assembly drawing of the switch in accordance with one non-limiting aspect of the present invention.

FIG. 4 illustrates a switch 88 in accordance with one non-limiting aspect of the present invention. The switch 88 may be configured to attach to the cable connectors 72, 74, 76, 78 of a deployed or existing tap or other tap lacking the switching capabilities associated with the tap of FIG. 3. The switch 88 may be slipped over or otherwise permanently and/or removably attached to a tap, such as one having a footprint matching the tap 70 in FIG. 3 but lacking capabilities sufficient to facilitate signal blocking. The switch 88 may be an aftermarket type of component capable of being attached to taps deployed within existing networks and/or for inclusion with new network constructions relying on previously produced taps lacking signal blocking capabilities. The switch 88 may include a first set of connectors 90 on one side for fitting over or otherwise establishing connections with the cable or coaxial connectors 72, 74, 76, 78 included on a tap and a second set of connectors 92 for mirroring or mimicking the cable or coaxial connections 72, 74, 76, 78 to facilitate clients connecting thereto. The switch 88 may include schematically illustrated solid-state devices 94 being controllable from a normally closed position to an opened position to facilitate blocking signals, optionally according to a bounce or other specified time. FIG. 5 illustrates an assembly drawing 98 of the switch 88 in accordance with one non-limiting aspect of the present invention whereby a back side of the switch 88 having the first set of connectors 90 may be fitted over a tap such that a front side of the switch 88 having second set of connectors 92 mirrors the connectors of the tap for purposes of attaching clients thereto.

Figure 6:
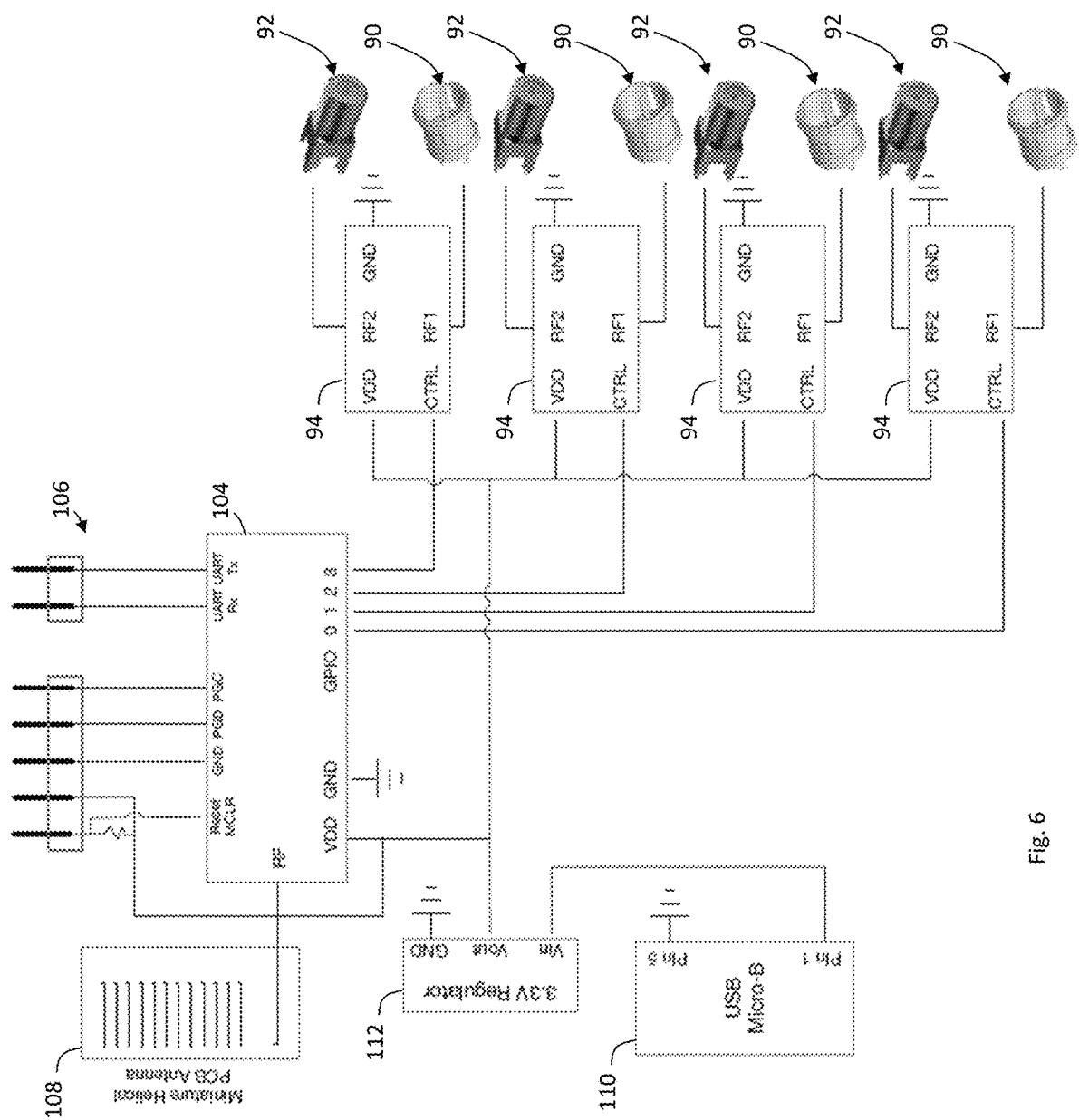
FIG. 6 illustrates a schematic for the switch in accordance with one non-limiting aspect of the present invention.

FIG. 6 illustrates a schematic 100 for the switch 88 in accordance with one non-limiting aspect of the present invention. The first and second sets of connectors 90, 92 may be shaped such that first set of connectors 90 have a generally hollow housing shaped to fit over threads on a tap, and the second set of connectors 92 have a threaded housing shaped to mimic the connectors on a tap. Solid-state switches 94 may be positioned between the first and second connectors 90, 92 to facilitate blocking signaling passing therethrough according to instructions received from a controller 104. A plurality of headers 106 may be included to facilitate additional connections to the controller 104, such as to facilitate facility loading software or otherwise programming its operation. An antenna array 108, which is shown for exemplary purposes as being a miniature, helical printed circuit board (PCB) antenna array, may be included to facilitate interfacing wireless signaling with the controller 104. A micro USB 110 or other suitable interface may be included to facilitate powering the switch, optionally with inclusion of a voltage regulator 112 to facilitate regulating the voltage utilized for operations. The switch 88 may include capabilities to facilitate solid-state opening and closing of signaling between the first and second connectors 90, 92 according to instructions received from the controller 104, which may optionally be communicated thereto via the antenna array and/or the headers 106. The controller 104 and/or the solid-state switches 94 may also receive corresponding instructions via the network 12, such as through signaling carried over the corresponding branch and interfaced with the controller via the headers and/or the first set of connectors.

One non-limiting aspect of the present invention contemplates the terminal device 14 or other device attempting to mitigate noise in the system transmitting uniquely addressable messages to the controller 104 facilitating control of the solid-state switches 94. The switch 88 may be operational according to an addressable tap framework based on simple IoT modules, like LoRa or Narrowband IoT (NB-IoT), that can improve ingress mitigation efficiency when combined with search algorithms/process. The control messages can be carried multiple ways based on deployment, e.g., wirelessly using LoRa radios or LTE radios over unlicensed or licensed frequencies or wiredly over the cable HFC plant using DOCSIS, MoCA, G.Hn or a similar protocol. The attendant messaging protocol may specify use of a positive acknowledgement of reception and execution of the message, such as to confirm execution of a switch opening or closing with an ACK message. The ACK message may include a unique sequence number to uniquely identify the specific message being acknowledged, and in the event that a message is received but cannot be executed, the client, switch, etc. may respond with a non-acknowledgement message or NACK. Using computer-controlled systems in this manner to find ingress sources can lead to less service interruption for subscribers and faster identification of transient sources while optionally limiting operational expenses by reducing the mean time to repair ingress issues. The switches described herein may include global positioning system (GPS) or be associated with location information, such as positional accordance within geographic accordance with an the network for the associated tap or other device housing the switches, to facilitate identifying a location for a noise source. The geographical/physical location of a noise source can be determined from a mapping associated with the location information, e.g., the location of the noise may correspond with the location of the closest/nearby switch.

Figure 7:
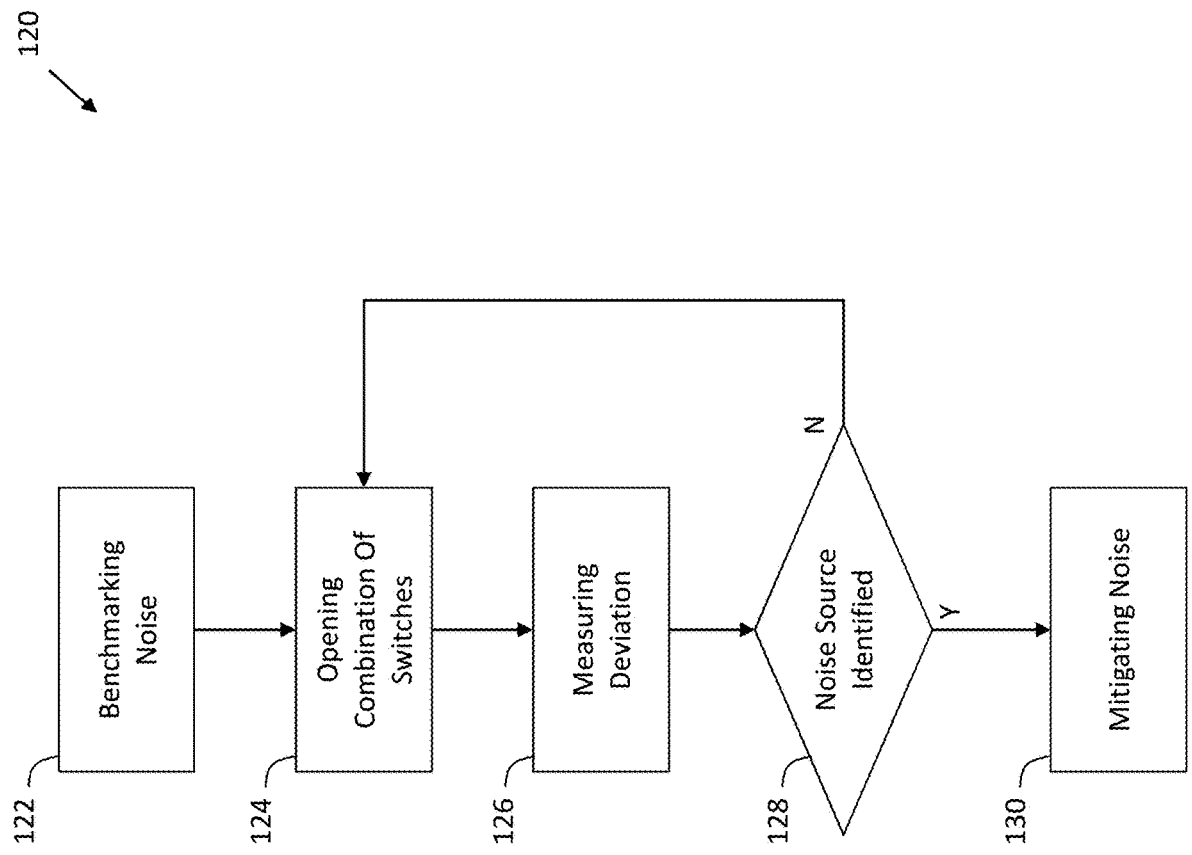
FIG. 7 illustrates a flowchart of a method for mitigating noise in a network in accordance with one non-limiting aspect of the present invention.

FIG. 7 illustrates a flowchart 120 of a method for mitigating noise in a network in accordance with one non-limiting aspect of the present invention. The method contemplates mitigating noise in networks of the type having a tree-branch architecture or other interconnection of communication mediums tending to make identification of noise sources difficult, such as when multiple branches converge in a manner leading to noise funneling or other obfuscations of noise sources or when possible sources of noise may be spread out over larger service areas. One non-limiting aspect of the present invention contemplates the network employing a bounded medium to facilitate communications, such as signaling being exchanged between a plurality of taps and a termination device. The bounded medium may be differentiated from a wireless or unbound medium in that ingress noise or other noises introduced to the bounded medium may be associated with its access points, i.e., taps or other client connections, and/or breakage, splicing or other breaches of its integrity, which may be characterized as noise sources. A detection process may be implemented to facilitate detecting one or more noise sources to facilitate mitigating the noise through technician repair or other processes, such as by blocking signaling associated with the affected portion of the network to mitigate its influence on other portions of the network and/or to identify its location as a function of the location of switches used to block noise therefrom.

Block 122 relates to benchmarking noise in the network. The benchmarking may include setting a reference to be used for an iterative process of assessing an effect of opening and closing differing combinations of switches or other signaling signal blockers in the network for purposes of detecting or isolating noise sources. The benchmarking may include comparing current noise levels, such as those being experienced at the termination device from upstream signaling being funneled thereto or at other locations in the network susceptible to noise, to a threshold associated with undesirable performance or noise levels sufficient to indicate a need for mitigation. The benchmarking may optionally include keeping a database of historical noise levels to identify noise trends, such as by tracking additional information or parameters associated with network conditions (load, congestion, bandwidth, traffic types), time of day, switches actively being controlled to block signaling, etc. One non-limiting aspect of the present invention contemplates a detection process to detect noise sources for purposes of mitigating the attendant noise, such as by isolating the noise from the network through corresponding switching opening or signal blocking and/or improved location detection of the noise sources. The detection process may include setting a benchmark noise or other datum sufficient for assessing deviations therefrom resulting coordinated opening/closing of switches in the network.

Block 124 relates to determining an initial combination of switches to be used in blocking signaling, such as by controlling solid-state switches to an opened position for a period of time specified according to a bounce parameter enabling temporary signal blockage without disrupting services or disconnecting clients. The switches initially selected to begin the detection process may be useful in generating a starting point for iteratively controlling additional switches, which may be instigated by blocking entire branches or larger segments of the network with the intention of isolating noise to a larger portion of the network initially, and thereafter subsequently refining the signal blocking to smaller portions and/or more specific locations of the network. Block 126 relates to measuring deviation of the noise resulting from the switches in Block 124 being controlled to block signaling, i.e., a change in the noise measured while the switches are opened in comparison to the benchmark noise. Block 128 relates to determining whether the measured deviation is sufficient to identify a source of the noise. An identification of the noise source may occur when the combination of switches in Block 124 are sufficient to reduce noise levels below an acceptable threshold, and a failure to identify the noise source may occur when that combination of switches is insufficient to reduce noise levels below the acceptable threshold. Block 130 relates to mitigating noise when an identification of its source is made, such as by dispatching a technician to the corresponding location or implementing other measures.

The source of the noise may be identified in the event the noise measured in Block 126 is sufficiently less than the benchmark noise to indicate a likelihood that it has been isolated through the signal blocking. The noise identification process may include assessing whether the identification is specific enough to end the detection process or whether additional granularity may be desired. Additional granularity or detail on the source of noise may be advantageous when the combination of switches sufficient to isolate the noise leaves too many possibilities of the potential sources, e.g., if a switch is opened at a tap to block signaling associated with a number of downstream taps, ending the detection process then may be undesirable as the noise source or sources could be associated with anyone of the downstream taps, which may be spread across too large of a geographical area or have too many potential sources for a technician to reasonably investigate. When the previously selected combination of switches is insufficient to identify noise sources or when more granularity in the selected combination of switches is desired, Block 124 may be returned to for purposes of selecting another combination of switches to block signaling. The additional combination of switches may be based on the previous selection of switches, i.e., selected from some number of switches therein, or from additional switches in the network.

In the event the previously selected switches were insufficient to reduce noise levels below the threshold, it may be advantageous to select additional switches for further analysis, i.e., more or different switches than in the prior combination. In the event the previously selected switches were sufficient to reduce noise levels below the threshold, it may be advantageous to select the next combination of switches from the previous combination, i.e., a lesser number of the previously selected switches and/or a more granular control of those switches. The switches within each combination of switches sufficient to reduce noise levels relative to the benchmark noise and/or below the noise threshold, i.e., some combinations of switches may be sufficient to reduce noise but failed to reduce the noise sufficient to surpass the noise threshold, may be characterized as mitigation switches. Characterizing switches as mitigation switches may be beneficial in iteratively comparing the switches involved in successful noise reduction from those failing to be involved in successful noise reduction. Since some of the mitigation switches, i.e., those switches included in some combination of switches previously sufficient to reduce noise, may not themselves produce an isolating effect on the noise, it may be desirable to select the next combination of switches from those mitigation switches to facilitate improved granularity in the noise detection process.

The detection process may continue operating according to the processes of Blocks 124, 126, 128 to facilitate measuring noise deviations associated with different combination of switches until a sufficient detection of the noise source is determined. The noise deviations measured for each combinations of switches selected in Block 124 may be compared to each other to facilitate intelligently determining a next or subsequent combination of switches to be used in signal blocking. The next set of switches switch combinations may be based on an algorithm or other process whereby a performance assessment of the previous combination of switches may be assessed and/or according to a predefined pattern or structure, i.e., a test procedure may be pre-defined for a certain combination and/or sequence of switches, which may be useful in periodically testing for noise influences using the same sequence of signal blocking. The use of solid-state switches or other switches having capabilities to block signaling without disrupting customer services may be beneficial in enabling the detection process to keep running essentially without any harmful effects. The termination device or other device tasked with performing the detection process may implement corresponding control of the switches using wireless and/or wired messages transmitted thereto. The use of wireless messages may be preferred over messages carried through the bounded medium in order to reduce signal traffic and/or to avoid the corresponding messages being influenced/harmed by the noise sources.

The termination device may be beneficial in facilitating the contemplated noise mitigation due to it having visibility and/or capability to communicate throughout the network. Additional devices may be utilized in place of or in cooperation with the termination device to facilitate noise mitigation. A cable modem (CM), such as one having capabilities for performing proactive network management (PNM), may collect PNM data or other data sufficient for the CM to make noise-based decisions. When a CM determines its house is making upstream noise, it can send a signal upstream that blocks the noise from the house entering the network while the home's noise is present e.g., through corresponding wired and/or wireless control of switches included at the associated tap. The signal can be turned off automatically, i.e., the signal blocking can cease, when the home wiring is fixed or if an emergency phone call is required. The CM can detect noise in a home, such as with a full band capture chip, and then notify a PNM server that its house has an upstream noise problem. The CM can send a carrier wave (CW) signal out that blocks all upstream noise coming from the home by activating an RF switch outside the home, such as within the tap or ground block. When the noise disappears, the CM can discontinue the CW signal, and if the CM needs to access upstream, such as for a 911 phone call, the CW can be suppressed for the upstream packets. A CMTS scheduler can give the noisy home exclusive use of the upstream band for the duration of the transmission, limiting damage to other users' signals.

When a home with bad shielding integrity is discovered, and the tech cannot get inside to make repairs, a power extracting tap can be installed and an automatic/CM controllable upstream noise blocker can be installed at the tap port, such as by replacing the tap with a tap having the switching capabilities described above, fitting over a switch to an existing taps illustrated above and/or inserting switches into an existing tap by removing its faceplate and inserting a switch circuit similar to that described above within the housing, i.e., adding the switch to the housing internally as opposed to fitting it thereover. Such a switch may switch upstream operation as follows: no noise detected, then upstream switch is normally closed; noise detected, then upstream switch automatically will open to block noise; the switch may be forced open by CM tone at 10 MHz (noise source detection test mode) and/or the switch may be forced closed by CM tone at 12 MHz (911 emergency call from home with a noise problem). Use of the CM to facilitate blocking signaling at a tap associated therewith may be beneficial in providing a localized capability for mitigating noise in a manner that may be unlikely to disrupt services for neighboring taps. The CMs may be limited to blocking signaling associated with its own tap, as opposed to controlling neighboring taps, so as to localize or limit its capabilities to affect signaling over the network.

The CM may communicate a message to the termination device prior to locally blocking signaling from its associated tap to notify the termination device or other network administrator of the signals being blocked. The termination device and/or the CM may generate a signature for the noise signal prompting the noise mitigation, which may be included within the message transmitted from the CM to the termination device and/or determined by the termination device in the event it detects the noise signal independently of the CM. The noise signature may be associated with the tap and/or another location associated with its source for later use in noise detection. One such use may occur when another noise signal is detected as having a signature matching with the noise signature of a previously detected noise stored at the termination device and/or the CM. The termination device and/or the CM can quickly ascertain the tap and/or source of the noise based on the location previously associated with its matching signature. The capability to match noise signatures, particularly after detection process whereby the likely source of the noise is determined through the iterative control of switches in a network, can be beneficial in allowing subsequent detection of noise sources without having to perform as many switch openings and/or closings. The matching of noise signatures may be limited to situations whereby sources have a pattern or history of generating a particular type of noise, i.e., the foregoing detection process may be needed to confirm the match and/or to verify its accuracy when sources lack a pattern or repeating noise signature.

While exemplary embodiments are described above, it is not intended that these embodiments describe all possible forms of the invention. Rather, the words used in the specification are words of description rather than limitation, and it is understood that various changes may be made without departing from the spirit and scope of the invention. Additionally, the features of various implementing embodiments may be combined to form further embodiments of the invention.

What is claimed is:

1. A system for detecting a source of noise in a hybrid fiber-coaxial (HFC) network, the HFC network including a headend, a cable modem termination system (CMTS) or other termination to exchange signals with clients through a plurality of taps, the system comprising:
   a plurality of switches connected to the taps, the switches including first connectors on an exterior backside and second connectors on an exterior frontside and circuitry within an interior, the first connectors being attached to coaxial connectors extending from an exterior of the connected-to tap and the second connectors being attached to cabling previously used to interface the clients with the connected-to tap, the circuitry interconnecting the first connectors with the second connectors and being independently controllable to selectively block and pass the signals therebetween; and
   a detection device at the termination for detecting a source of noise in the HFC network based on variations in noise measurements made at the termination while different combinations of the switches are being controlled to block the signals.

2. The system of claim 1 wherein the detection device wirelessly transmits control messages to the switches to control the switches, the control messages specifying a length in time for the switch in receipt thereof is to block signaling between one or more of the first and second connectors before automatically returning to a closed position, the detection device determining the length based on services being accessed such that the length is specified in the control messages to be less than that needed to disrupt the services.

3. The system of claim 1 wherein the second connectors shaped to mirror the coaxial connectors extending from the exterior of the connected-to tap such that the second connectors are arranged in the same pattern as the coaxial connectors thereby resulting in the second connectors having essentially the same dimensions and spacing as the coaxial connectors.

4. The system of claim 3 wherein a switch housing of the switches mimics a tap housing of the taps such that the switch housing and the tap housing have approximately the same width and height, and wherein the first connectors have a hollow body to fit over top of the coaxial connectors and the second connectors have a threaded body for threading to the cabling.

5. The system of claim 1 wherein the circuitry includes independent signaling paths between aligned first and second connectors such that each signaling path interconnects the first connectors with no more than one of the second connectors, each signaling path including an independently controllable, solid-state switch capable of being controlled between an opened position and a closed position to mitigate the noise, the opened position blocking signaling through the corresponding signaling path and the closed position permitting signaling through the corresponding signaling path.

6. The system of claim 5 wherein the circuitry includes a default setting for the solid-state switches that requires the switches to remain in the closed position unless being controlled to the opened position, the default setting automatically controlling the solid-state switches from the opened position to the closed position within at least 200 ms of being controlled to the opened position in order to prevent disrupting services.

7. The system of claim 5 further comprising:
   a plurality of cable modems connected downstream of the switches to facilitate interfacing the signals with the client at client locations, the cable modems including capabilities for wirelessly transmitting noise instructions when detecting noise ingress thereat; and
   wherein the circuitry includes an antenna for wirelessly receiving the noise instructions from the cable modems, the noise instructions being sufficient for the originating cable modem to selectively control the solid-state switch of the second connector associated therewith to the opened position to block the noise ingress.

8. A method for mitigating noise in a network comprising:
   measuring a noise in the network at a termination device, the termination device being positioned at a convergence in the network where signaling commonly funnels from a plurality of taps, each of the taps including tap connectors for connecting to cabling used to carry signaling between the tap and client devices downstream thereof;
   after measuring the noise, interspersing a plurality of interconnects between the taps and the cabling, the interconnects including first connectors for connecting to the tap connectors and second connectors for connecting to the cabling, the interconnects including circuitry for defining signaling paths between each of the first connectors and no more than one of the second connectors, each signaling path including a switch capable of being controlled between an opened position and a closed position, the opened position blocking signaling through the signaling path and the closed position permitting signaling through the signaling path; and controlling one or more of the switches from a closed position to an opened position to facilitate mitigating the noise.

9. The method of claim 8 further comprising:

a plurality of operator devices being connected to the cabling downstream of the interconnects to facilitate interfacing signaling with the client devices at client locations, the operator devices including capabilities for proactive network maintenance and for wirelessly transmitting noise instructions when detecting noise ingress thereat; and wherein the interconnects include an antenna for wirelessly receiving the noise instructions from the operator devices, the noise instructions being sufficient for the originating operator device to selectively control the switch of the second connector associated therewith to the opened position to mitigate the noise ingress.

10. The method of claim 8 further comprising:

measuring a first noise at the termination device at a first instance coinciding with one or more first switches of the switches being controlled to the opened position;

measuring a second noise at the termination device at a second instance coinciding with one or more second switches of the switches being controlled to the opened position;

comparing the noise to the first and second noises to detect a source of the noise; and controlling the first and second switches from the closed position to the opened position using wirelessly transmitted control messages.

11. The method of claim 10 further comprising:

determining signaling-dependent services accessed through the switches being controlled to the opened position; and specifying a bounce within the control messages based on the services being accessed, the bounce specifying a length of time for the switch in receipt thereof to be in the opened position before automatically returning to the closed position, including selecting the length of time to be less than that needed to disconnect from the services being accessed.

12. A method for mitigating noise in a network, the network employing a bounded medium to facilitate carrying signals between a termination and a plurality of taps, the method comprising:

determining a noise at the termination resulting from ingress signaling funneled thereto from an unknown one or more of the taps, each of the taps including one or more coaxial connectors for attaching to cabling used to interface signaling with additional portions of the network;

disconnecting the cabling from and removably attaching a plurality of switches to at least a portion of the coaxial connectors such that the switches are positioned between the tap and the cabling previously connected thereto, each of the switches including:
i) first connectors attached to the coaxial connectors;
ii) second connectors attached to the cabling; and
iii) circuitry enclosed within a housing to controllably interface signaling between the first and second connectors, the circuitry being controllable between closed positions and opened positions to respectively permit and prevent signaling between the first and second connectors; and selectively controlling the switches between the closed and opened positions to identify the switches capable of mitigating the noise.

13. The method of claim 12 further comprising executing a detection process according to instructions issued from the termination or a tester connected proximate thereto, the detection process iteratively controlling the switches between the opened and closed positions to determine a combination of the switches sufficient to isolate a source of the noise.

14. The method of claim 13 further comprising executing the detection process without disrupting services being accessed by clients connected to the cabling.

15. The method of claim 13 further comprising iteratively controlling the switches to the opened position for no more than 200ms, the 200ms corresponding with a duration insufficient to interrupt services for clients connected to the taps.

16. The method of claim 13 further comprising iteratively controlling the switches to the opened position for a duration not to exceed a threshold, the threshold being based on the detection process performing an assessment of services being accessed by the clients and correspondingly selected to be less than a length of time needed to disconnect the clients from the services.

17. The method of claim 13 further comprising controlling the switches between the opened and closed positions using wireless signaling transmitted thereto independently of the bounded medium.

18. The method of claim 13 further comprising controlling the switches between the opened and closed positions using signaling transmitted thereto over the bounded medium.

19. The method of claim 12 further comprising attaching the switches proximate to the taps using no more than the coaxial connectors in support.

20. The method of claim 12 further comprising attaching the switches to fasteners associated with the coaxial connectors.

* * * * *